US010462265B2

United States Patent
Edmiston et al.

(10) Patent No.: US 10,462,265 B2
(45) Date of Patent: Oct. 29, 2019

(54) ON-DEMAND STARTUP OF OFFLINE SERVERS AND CONNECTION ROUTING

(71) Applicant: Plex, Inc., Los Gatos, CA (US)

(72) Inventors: Greg Edmiston, Seattle, WA (US); Schuyler Ullman, Sacramento, CA (US); Elan Feingold, Haiku, HI (US); Scott Olechowski, San Jose, CA (US)

(73) Assignee: Plex, Inc., Los Gatos, CA (US)

( * ) Notice: Subject to any disclaimer, the term of this patent is extended or adjusted under 35 U.S.C. 154(b) by 282 days.

(21) Appl. No.: 15/436,579

(22) Filed: Feb. 17, 2017

(65) Prior Publication Data

US 2018/0241849 A1    Aug. 23, 2018

(51) Int. Cl.
*G06F 15/16* (2006.01)
*H04L 29/06* (2006.01)
*H04L 29/08* (2006.01)
*H04L 12/26* (2006.01)

(52) U.S. Cl.
CPC ............ *H04L 67/42* (2013.01); *H04L 43/16* (2013.01); *H04L 67/28* (2013.01); *H04L 67/32* (2013.01)

(58) Field of Classification Search
None
See application file for complete search history.

(56) References Cited

U.S. PATENT DOCUMENTS

| | | | |
|---|---|---|---|
| 2008/0229025 A1* | 9/2008 | Plamondon | G06F 12/0862 711/126 |
| 2014/0122580 A1* | 5/2014 | Nuaimi | H04L 63/0281 709/203 |
| 2014/0244818 A1* | 8/2014 | Taine | H04L 65/40 709/223 |
| 2016/0088022 A1* | 3/2016 | Handa | G06F 16/957 |
| 2017/0048125 A1* | 2/2017 | Hayton | G06F 1/3296 |
| 2017/0359735 A1* | 12/2017 | Jain | H04W 24/02 |
| 2018/0367645 A1* | 12/2018 | Lepeska | H04L 67/42 |

* cited by examiner

*Primary Examiner* — Phyllis A Book
(74) *Attorney, Agent, or Firm* — Elliot H. Karlin; Hickman Palermo Becker Bingham LLP

(57) ABSTRACT

A method and apparatus for providing remote access to an unavailable server is provided. In an embodiment, a proxy server computer receives a request to access data over a network from a client computing device. The proxy server computer identifies a particular server computer that is separate from the client computing device to fulfill the request. The proxy server computer then determines that the particular server computer is unavailable to a client computing device. In response to determining the particular server is unavailable to the client computing device, the proxy server computer maintains a transport layer connection from the client computing device. While maintaining the transport layer connection, the proxy server computer initiates startup of the particular server computer. In response to receiving an indication that the particular server computer is available to the client computing device, the proxy server computer passes the connection from the client computing device to the particular server computer.

25 Claims, 3 Drawing Sheets

ID OF THE DISCLOSURE

ON-DEMAND STARTUP OF OFFLINE SERVERS AND CONNECTION ROUTING

FIELD OF THE DISCLOSURE

The technical field of the present disclosure generally relates to computer hardware, software, and systems that implement communications between client computing devices and server computers. The technical field of the disclosure also is computer hardware, software and systems that are programmed for initiating startup of offline servers and routing connections through a proxy server from a client computing device to an online server.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The client-server model of computing allows a server computer to provide services to one or more client computing devices. By using server computers to store data, client computing devices can obtain access to large amounts of data that cannot be directly stored on the client computing device due to storage constraints. Additionally, server computers may provide services for client computing devices such as performing computations or sharing resources so that a client computing device can perform functions it would not be able to perform alone.

Generally, for a client computing device to use the services of a server computer, the server computer must be currently running at the time the client requests services. If the server computer is not then-currently running, the server computer would be unable to respond to a request to connect from the client computing device. Historically, one or more servers would be provisioned for a large number of client computing devices. These servers may be powered on and off manually or automatically for periods of time where server usage is expected to be high. Similar processes may be used to selectively activate or "spin up" virtual machine instances, for example, using cloud computing environments.

While historically servers were provisioned to service large numbers of client computing devices, modern server computers may be provisioned for one or two client computers. In the case of cloud computing, virtual servers may be provisioned in the cloud for individual computing devices. The virtual servers may include one or more applications that allow the server to run independently. For example, a software container includes a server instance and each application necessary to run the server instance on its own on either a home computer, physical server computer, or in the cloud. Such containers may be used to provision individual servers for individual users or for small groups of users.

While personal servers can be useful for allowing individual users to store large amounts of data, server usage can become expensive. Resources may be wasted when a server computer is running in which the server computer is not being used. While the waste may not be as large on an individual scale, the cumulative waste of a large number of individual servers running at any time can be quite costly.

A similar issue exists with large infrastructures using a plurality of servers. If a large number of client computing devices connect to a first server computer, a second server computer will be spun up to handle future overload. If the estimate future overload does not arrive or does not arrive immediately, then a company will have to pay for usage of one of the servers even though the server is not performing a function. Even if some client computing devices are offloaded from the first server computer to the second server computer, a company is still paying for adding server space that is not being used. Additionally, the predictive model of spinning up server computers can run into problems if data is requested from a server at an unexpected time or location. If a server is not currently running to fulfill a client request, then the client computing device may receive an error. To avoid failures to service client computing devices, servers must be constantly running to handle unexpected data requests.

If a client computing device attempts to access a server that is not online or is otherwise unreachable, the client computing device will receive an error indicating that a connection cannot be made. The client computing device can then respond by connecting to a proxy server and requesting that the proxy server spin up the server that the client computing device is attempting to access. The proxy server will initiate the steps to spin up the server computer and then wait for a response from the server computer indicating that the server computer is online. The proxy server then sends the IP address and hostname of the server computer to the client computing device so that the client computing device can access the server directly.

The steps for turning on and connecting to a private server can be cumbersome for a user of a client computing device. This problem is amplified if the user of the client computing device is not technically savvy, given the large number of steps that have to be manually performed by the user. Even accessing a server within a user's own home can become difficult due to network security such as firewalls. A user must still contact an outside service to identify how to access a home server before being able to directly connect a client computing device to the home server.

Thus, there is a need for a system which can eliminate the inefficiencies of running servers when they are unnecessary without causing the client computing devices to run into errors upon attempting to access an offline server.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

General Overview

Systems and methods are provided for eliminating the inefficiencies of unnecessarily running additional servers while eliminating negative effects on users caused by attempts to access offline servers. In an embodiment, one or more servers are maintained in an offline state. A client computing device establishes a network connection, such as a transport layer connection, with a proxy server computer. The proxy server computer receives a request from the client computing device to access data in a particular server. The proxy server computer identifies the intended server based on information in the request. The proxy server computer then determines that the identified server is not online. In response to determining that the identified server is not online, the proxy server does not close but maintains the transport layer connection with the client computing device, stores any data being sent to the identified server, and initiates startup of the identified server. Upon receiving an indication that the server is online, the proxy replays any stored data from the client computing device to the identified server. Additionally, the proxy server may connect the client computing device with the identified server so that all future communications can occur directly between the client computing device and the server. From the perspective of the client computing device, the server does not appear offline, and the access to the server is direct even though the server was offline at the time the data request was made.

In an embodiment, a method comprises receiving, at a proxy server computer from a client computing device, a request to access data over a network; identifying, at the proxy server computer, a particular server computer that is separate from the proxy server computer to fulfill the request from the client computing device; determining, at the proxy server computer, that the particular server computer is offline; in response to determining that the particular server computer is offline, performing, at the proxy server computer: maintaining a transport layer connection from the client computing device; while maintaining the transport layer connection, initiating startup of the particular server computer; determining that the particular server computer is online; in response to determining that the particular server computer is online, passing the connection from the client computing device to the particular server computer.

Structural Overview

Figure 1:
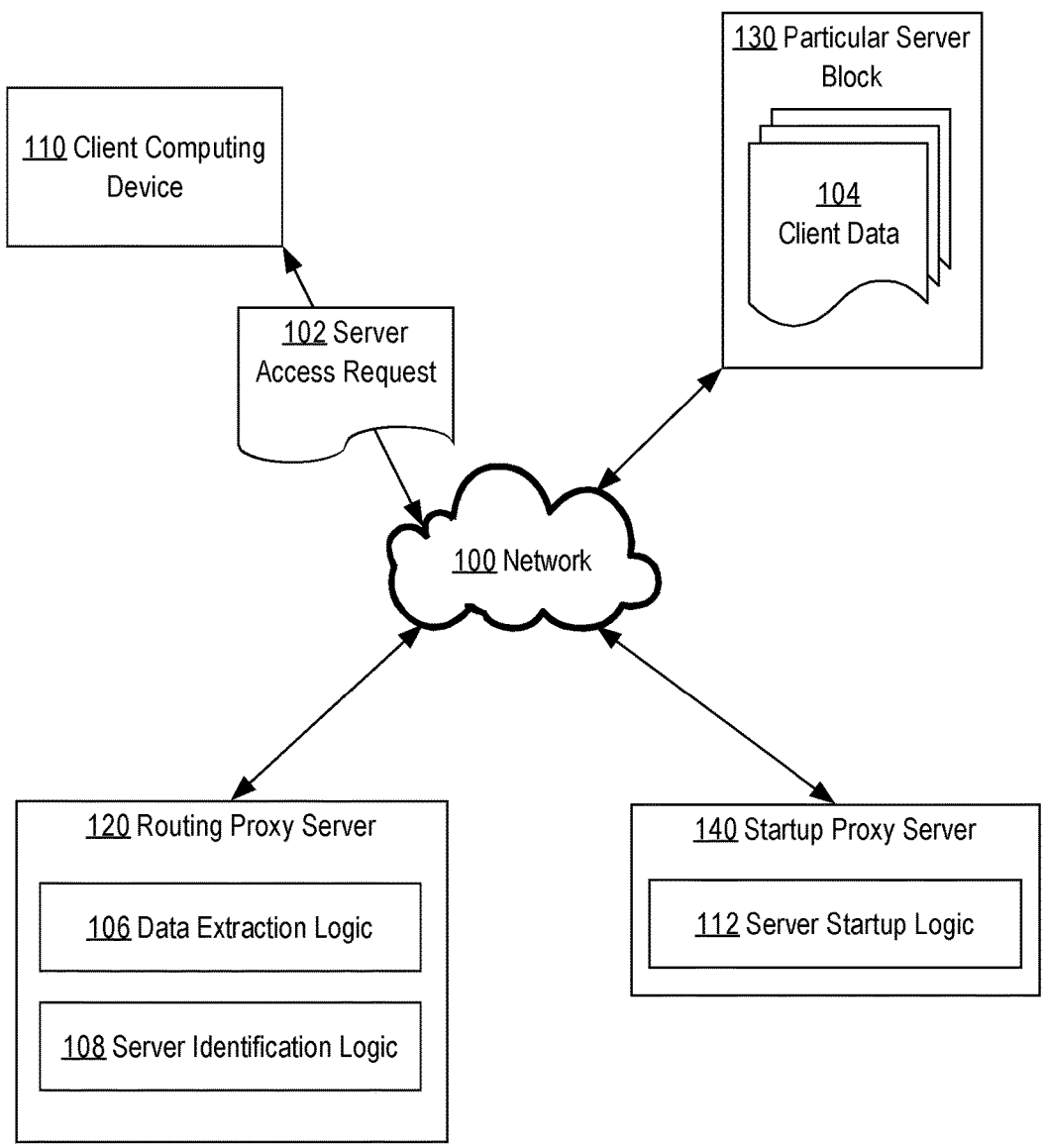
FIG. 1 depicts an example system in which the techniques described may be practiced, according to one embodiment.

FIG. 1 depicts an example system in which the techniques described may be practiced, according to one embodiment.

In the example of FIG. 1, a client computing device 110, a routing proxy server 120, a particular server block 130, and a startup proxy server are communicatively coupled to a data communications network 100. The network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The client computing device 110, routing proxy server 120, particular server block 130, startup proxy server 140, and other elements of the system each comprise an interface compatible with the network 100 and are programmed or configured to use standardized protocols for communication across the networks such as TCP/IP, Bluetooth, and higher-layer protocols such as HTTP, TLS, and the like.

Client computing device 110 is a computer that includes hardware capable of communicatively coupling client computing device 110 to one or more server computers, such as routing proxy server 120 and startup proxy server 140 over one or more service providers. For example, client computing device 110 may include a network card that communicates with routing proxy server 120 and startup proxy server 140 through a home or office wireless router (not illustrated in FIG. 1) coupled to an internet service provider. Client computing device 110 may be a smart phone, personal computer, tablet computing device, PDA, laptop, or any other computing device capable of transmitting and receiving information and performing the functions described herein.

Each of routing server 120, particular server block 130, and startup proxy server 140 may be implemented using a server-class computer or other computer having one or more processor cores, co-processors, or other computers. FIG. 1 depicts client computing device 110, routing server 120, server blocks 130 containing particular server block 130, and startup proxy 140 as distinct elements for the purpose of illustrating a clear example. However, in other embodiments more or fewer server computers may accomplish the functions described herein. For example, a plurality of client computing devices 110 may attempt to connect to a plurality of particular servers in server blocks 130. As another example, a single server computer may perform the functions of routing proxy server 120 and startup proxy server 140.

Server blocks 130 comprise a plurality of destination servers. For example, server blocks 130 may comprise a plurality of virtual media server instances stored in a data center, such as through cloud computing. The virtual media server instances may be stored with the applications and libraries necessary to run the virtual media server instance, such as through a software container. Code for implementing containers is available on Github or Docker Hub, for example, from Docker, Inc. of San Francisco, Calif. Additionally and/or alternatively, server blocks 130 may comprise a plurality of physical servers at one or more geographic locations. As an example, server blocks 130 may include personal servers located at the homes of users of the client computing devices. As another example, company servers may be located in a plurality of geographic locations in order to service different regions with reduced latency.

Particular server block 130 comprises a particular server computer for which client computing device 110 has access. For example, client computing device 110 may access a media storage service, such as the PLEX media service, commercially available from Plex, Inc., Los Gatos, Calif., which offers the option to set up a personal virtual media server. The client computing device 110 may request a personal virtual media server in order to access media such as video and audio files. In other embodiments, particular server block 130 is a media server selected to fulfill a client computing device request. For example, a company may contain physical servers in multiple geographic locations in order to service the needs of geographically diverse clients. Particular server block 130 may comprise the physical server in the location closest to client computing device 110. Thus, if a client computing device in North America requests to access data from the company, a North America based server computer may be identified to fulfill the request to access data.

Routing proxy server 120 comprises a proxy server computer that is configured or programmed for routing data requests from a client computing device 110 to a particular server block 130. Routing proxy server 120 may be an HTTP server, a reverse proxy server, and/or a TCP/UDP proxy server. An example of a routing proxy server 120 is the NGINX server. Routing proxy server 120 may be programmed or configured to receive requests from a client computing device 110 to access data from a particular server computer. Routing proxy server 120 may also be programmed or configured to identify one or more servers based on requests from the client computing device and connect the client computing device to the identified one or more servers.

Startup proxy server 140 comprises a proxy server computer that is programmed or configured for initializing a particular server of server blocks 130 that is not currently online. Startup proxy server 140 may be an HTTP server, a reverse proxy server, and/or a TCP/UDP proxy server. Initializing an offline server may comprise initializing a physical server through the spin-up of a hard disk drive or optical disk drive. Additionally and/or alternatively, initializing an offline server may comprise spinning up a virtual machine through execution of one or more applications on a physical server. For example, if a virtual server is not currently running on a physical computer, a process may be executed to begin running the virtual server.

In operation, client computing device 110 sends server access request 102 over network 100 to routing proxy server 120. Server access request 102 may be any request to access data from a server computer separate from the client computing device. Examples of server computers may include physical home servers, virtual home servers, physical servers at a remote location, and/or virtual servers at a remote location. Server access request 102 may directly identify the target server computer, such as through a static uniform resource locator (URL) which uniquely identifies a virtual media server. Additionally and/or alternatively, the data access request may be a general request to access a server without directly identifying a specific server to access.

Each of data extraction logic 106, server identification logic 108, and server startup logic 112 comprises a set of one or more pages of main memory, such as RAM, in a server computer into which executable instructions have been loaded and which when executed cause the proxy server computers to perform the functions or operations that are described herein with reference to those modules. For example, the data extraction logic may comprise a set of pages in RAM that contain instructions which when executed cause performing the data extraction functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of data extraction logic 106, server identification logic 108, and server startup logic 112 also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those modules. In other words, the drawing figure may represent the manner in which programmers or software developers organize and arrange source code for later compilation into an executable, or interpretation into bytecode or the equivalent, for execution by the one or more server computers.

Data extraction logic 106 comprises computer readable instructions in a portion of memory of the routing proxy server 120 and which, when executed by one or more processors, causes routing proxy server 120 to intercept a server access request and extract data from the server access request. For example, data extraction logic 106 may comprise one or more rules for breaking down a static URL into components such as unique identifiers, region identifiers, and/or service identifiers. Additionally and/or alternatively, data extraction logic 106 may comprise rules for extracting data from a header of a request, from data within the request, and/or from client computing device information such as internet protocol (IP) address or geographic location of the client computing device.

Server identification logic 108 comprises computer readable instructions in a portion of memory of the routing proxy server 120 and which, when executed by one or more processors, causes routing proxy server 120 to identify one or more server computers based on the data extracted from the data access request. Identifying the one or more servers may comprise accessing a mapping between unique identifiers and server identifiers. Additionally and/or alternatively, server identification logic 108 may identify a server to fulfill the data access request based on location of the client computing device and/or other client computing device identification information.

Server startup logic 112 comprises computer readable instructions in a region of memory of the startup server proxy 140 and which, when executed by one or more processors, causes startup proxy server to initiate startup of particular server block 130. Additionally, server startup logic 112 may, when executed by one or more processors, cause startup proxy to temporarily store data sent by client computing device 110 to particular server block 130 and to forward that data to particular server block 130 when particular server block 130 is online. Server startup logic may, when executed by one or more processors, cause startup proxy server to, in response to determining that particular server block 130 is online, connect client computing device 110 to particular server block 130.

Server Communication

Figure 2:
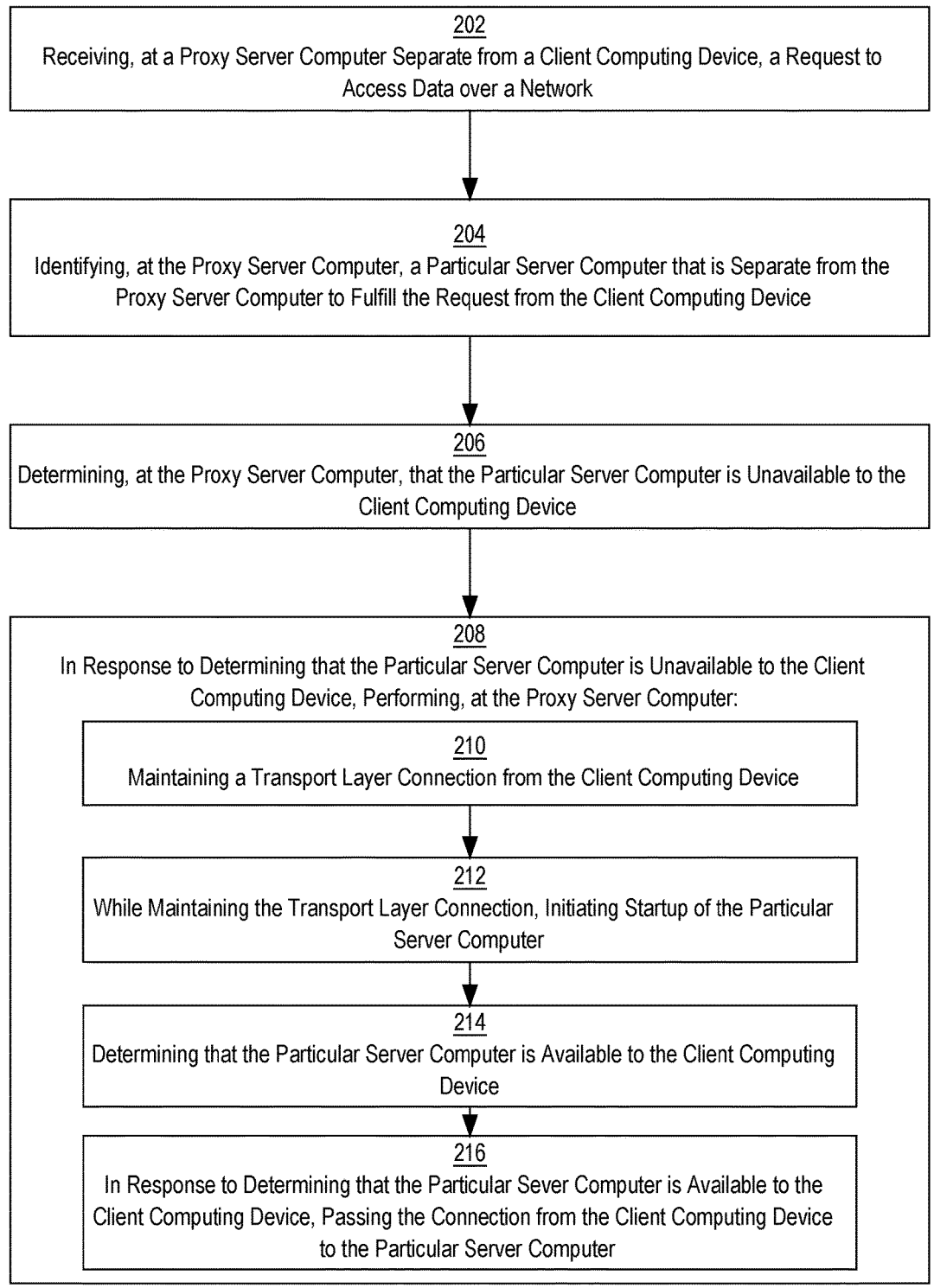
FIG. 2 is a flow diagram that depicts an example method of connecting a client computing device to an offline server.

FIG. 2 is a flow diagram that depicts an example method of connecting a client computing device to an offline server. FIG. 2 illustrates an example of an algorithm or plan that may be used as a basis of programming instructions in elements of FIG. 1 to implement the functions that are described in the following sections. FIG. 2 is presented at the same level of detail that persons of skill in the art to which this disclosure pertains are accustomed to using for the purpose of communicating algorithms, plans, specifications or techniques for programming the general type or class of computer program that can implement the functions that are described in the following sections.

At step 202, a request to access data over a network is received at a proxy server computer that is separate from a client computing device. For example, a client computing device may attempt to access a server computer associated with a unique uniform resource locator (URL). The request to access data may be intercepted at a proxy server computer. In an embodiment, the proxy server computer is programmed or configured to intercept particular requests to access data. For example, the proxy server computer may be maintained by an entity which provides access to personal media servers to one or more users. The entity may provide a URL to the client computing device to be used to access one or more server computers. Requests to access the personal media servers may be routed through the proxy server computer.

In an embodiment, the request to access data does not identify a particular server to service the request. As an example, an entity may maintain a plurality of servers at a plurality of geographic locations, each of which is capable of servicing the request to access data. Alternatively, an entity may maintain a single server which services requests of a particular type. In either case, a request to access data may not specifically identify a server to service the request to access the data. Instead, the request may be routed through a proxy server through an application programming interface (API) of an application hosted by a particular entity and executing on the client computing device.

In an embodiment, the client computing device executes an application with a graphical user interface which identifies one or more server computing devices. The graphical user interface may include one or more controls for requesting access to particular data. For example, a graphical user interface for an online video game may include an option to connect to a server associated with the game. As another example, a personal media application may identify one or more servers to which a particular user has been granted access. In an embodiment, the graphical user interface does not indicate whether the server is online or offline, thereby allowing the methods described herein to be performed without a user of a client computing device knowing that the method is occurring.

In an embodiment, the request to access data is encrypted such that the proxy server computer is unable to access the data in the request. For example, a user of a client computing device may wish to upload personal videos to a personal server without said videos being viewable to anyone other than the user of the client computing device. Thus, the client computing device may use end-to-end encryption to ensure that intermediary computing devices are unable to access data in the request.

Identifying a Server Computer

At step 204, a particular server computer separate from the proxy server computer is identified to fulfill the request from the client computing device. The particular server computer may be any of a physical server computer, a virtual server computer, or a software container running on a computing device. Routing proxy server 120 may extract data from the request to identify the particular server computer to fulfill the request. For example, a destination identifier, such as a unique URL, may be provided to the client computing device to allow the client computing device to access a particular server. Routing proxy server 120 may store data which maps one or more components of unique URLs, such as the hostname portion of the URL, to particular server computers. Based on at least a portion of a received URL, routing proxy server 120 may identify the intended server computer to fulfill the request for data.

In an embodiment, identification data extracted from the request includes data regarding the requesting client computing device. For example, routing proxy server 120 may be programmed or configured to identify an operating system of the requesting computing device from data in the header of the request. Additionally and/or alternatively, routing proxy server 120 may be programmed or configured to identify the internet protocol (IP) address of the requesting client computing device.

Based on information regarding the requesting client computing device, routing proxy server 120 may identify one or more particular server computers to fulfill the request for data. For example, routing proxy server 120 may store data which maps particular servers to particular operating systems and/or to particular IP addresses. Using the mapping data, routing proxy server 120 may identify an appropriate server computer to fulfill the client request based on an identified operating system of the requesting client computing device or an IP address of the client computing device.

In an embodiment, the header of the request includes information regarding the requested server computer and/or the requesting user. For example, the header may include a unique username associated with a particular account of a user with an external service. Based on the unique username, routing proxy server 120 may identify servers that have been previously selected to fulfill data requests for the user. As another example, the header may identify the data requested by the client computing device. For instance, the client computing device may request data from a portion of a database that is stored on one or more servers. Routing proxy server 120 may store information that identifies which servers are storing which data. In response to receiving a request for particular data, routing proxy server 120 may identify which servers are capable of fulfilling the client request by determining which servers currently store the particular data requested.

In an embodiment, routing proxy server 120 is programmed or configured to identify a geographic location of a requesting client computing device based on the data in the request. The geographic location may be identified in a header of the request or through an IP address associated with the request. Based on the geographic location of the client computing device, routing proxy server 120 may select a particular server to fulfill the data request. For example, routing proxy server 120 may select a North American server to fulfill a request originating in California and a European Server to fulfill a request originating in London.

Encrypted Data Implementation

In an embodiment, the request to access data from a server comprises end-to-end encryption. For example, a media storage service may offer end-to-end encryption so that a user may upload personal videos to a personal media server. As routing proxy server 120 does not have access to the encryption key, routing proxy server 120 may be unable to identify a particular server computer from the encrypted data.

When a data request contains encrypted data, routing proxy server 120 may extract a destination identifier for the particular servers from a predetermined sequence in one or more security protocols. For example, the transport layer security (TLS) protocols define a procedure, called the TLS handshake, by which a client computing device authenticates itself to the particular server and identifies which encryption keys are to be used to decrypt the data. As the TLS handshake is partially used to identify the encryption key, the TLS handshake itself is not encrypted.

A predetermined sequence, such as the TLS handshake, includes a series of messages between the client computing device and the server computer. Routing proxy server 120 may extract data from the predetermined sequence in order to identify the server to which the encrypted data is being sent. For example, in the TLS handshake, the client computing device sends a message called "ClientHello" which contains the destination server's hostname. Routing proxy server 120 may extract the destination hostname from the ClientHello message prior to connecting the client computing device to the server computer. Based on the extracted hostname, routing proxy server 120 identifies the particular server computer.

Background Access to Offline Server

At step 206, a determination is made at the proxy server computer that the particular server computer is unavailable to the client computing device. In an embodiment, the proxy server computer determines whether the particular server computer is offline. For example, routing proxy server 120 may attempt to route the connection from the client computing device to the identified particular server. If the particular server is online, then routing proxy server computer 120 may route the connection from the client computing device to the server. If the particular server is offline, then routing proxy server 120 may receive an error. As used herein, 'online' refers to whether a physical or virtual server is running. In the case of a physical server, online may refer to whether the server has been powered on and connected to the internet. In the case of a virtual machine, online may refer to whether an instance of the server is currently executing. In the case of a mobile device such a smartphone, tablet, or laptop computer, online may refer to whether the device is in a full power state and currently running the server application software.

In an embodiment, the proxy server computer determines whether the particular server computer is reachable by the client computing device. For example, a home server may be running, but not directly reachable to the client computing device due to a firewall blocking communication between the client computing device and the home server. As another example, a mobile device may be currently running the server application software, but in an inactive state. In either case, routing proxy server 120 may receive an error when attempting to route the connection from the client computing device to the identified particular server.

In an embodiment, routing proxy server 120 attempts to use one of a plurality of servers to fulfill the request of the client computing device. For example, if client computing device 110 request access to data that is hosted by a plurality of servers, routing proxy server 120 may first attempt to use the identified particular server to fulfill the request of the client computing device. If the attempt to access the identified particular server returns an error, routing proxy server 120 may identify a second server computer that is capable of fulfilling the request to access data and attempt to access the second server computer. Routing proxy server 120 may repeat this process until routing proxy server 120 determines that no remaining server is capable of fulfilling the request of the client computing device.

In an embodiment, in response to determining that the particular server computer is offline, routing proxy server 120 executes digitally programmed logic to determine whether to attempt to access a different server computer or to continue to step 208. For example, routing proxy server 120 may identify a European server in response to a request to access data from a client computing device in Europe. If the European server is offline, routing proxy server 120 may determine whether to start up the European server or to transfer the request to a North American server. If the European server tends to get a small number of requests during a particular period of time, routing proxy server 120 may transfer requests received during that period to the North American server. Alternatively, if routing proxy server 120 determines that the European server is likely to start receiving a large number of request, routing proxy server 120 may initiate startup of the European server.

At step 208, in response to determining that the particular server computer is unavailable to the client computing device, the proxy server computer performs a method of bringing the particular server computer online or otherwise making the particular server computer available to the client computing device and transferring the client data request to the online server computer using the following method. For example, routing proxy server 120 may perform steps 210-214 in response to attempting to access each identified server computer and receiving an error at each attempt.

Additionally and/or alternatively, routing proxy server 120 may be programmed or configured to forward the request to access data to startup proxy server 140 as a catch-all when routing proxy server 120 has run out of identified servers to which to attempt to connect. Routing proxy server 120 may additionally identify a particular offline server to routing proxy server 120. Startup proxy server 140 may then perform steps 210-214 in order to bring the particular server online and patch the connection from client computing device 110 to the particular server.

At step 210, a transport layer connection from the client computing device is maintained. For example, instead of ending the connection to the client computing device upon determining that the particular server is offline, startup proxy server 140 may maintain the transport layer connection from the client computing device while performing the initiation of the startup of the particular server. That is, rather than tearing down or closing a connection under circumstances specified in a protocol standard that otherwise would require the connection to be closed, the connection is maintained in an active or ESTABLISHED state. Data received from the client computing device while the connection is maintained may be stored in a temporary buffer of routing proxy server 120. For example, startup proxy server 140 store the ClientHello message and any subsequent messages from client computing device 110 in a buffer until the particular server is online.

At step 212, while maintaining the transport layer connection, startup of the particular server computer is initiated. Startup, in this context, refers to making the particular server computer available to the client computing device. Startup may include bringing an offline server online, bringing an inactive server to an active state, or opening a connection that was originally blocked by a firewall. For example, startup proxy server 140 may connect to an application programming interface (API) of one or more server startup services to initiate startup of the server. Initializing an offline server may comprise initializing a physical server through the spin-up of a hard disk drive or optical disk driver. Additionally and/or alternatively, initializing an offline server may comprise spinning up a virtual machine through execution of one or more applications on a physical server.

For example, if a virtual server is not currently running on a physical computer, a process may be executed to begin running the virtual server. As another example, startup proxy server 140 may send a message to the particular server computer through an available channel request the particular server computer to be made available through a different communication channel. In the case of a mobile device, a message may be sent through WiFi or through a cellular network to bring the mobile device from an inactive state to an active state.

At step 214, in response to determining that the particular server computer is available to the client computing device, the connection is proxied from the client computing device to the particular server computer. For example, after initiating the startup process, startup proxy server 140 may wait to receive an indication that the server has been brought online or otherwise made available to the client computing device. The indication may be a completion message from the server startup services and/or a message from the particular server computer. Upon receiving an indication that the server is online, startup proxy server 140 may pair the client computing device to the particular server computer.

In an embodiment, startup proxy server 140 additionally replays any data received from the client computing device to the particular server computer. For example, startup proxy server 140 may store any data received from the client computing device in a buffer. When startup proxy server 140 receives an indication that the particular server is online, startup proxy server 140 may replay the data stored in the client buffer for the particular server. By storing and replaying the data sent to the particular server, startup proxy server allows the client computing device to interact with the server before the server is brought online. Thus, the client computing device does not have to resend any data to the particular server or wait for the particular server to come online before sending data to the particular server.

On Demand Server Startup

In an embodiment, the techniques described herein may be employed to maximize the efficient use of one or more servers. The techniques described herein allow a particular server to be brought online when the server is needed instead of being brought online based on the assumption that the server will be needed later. For example, an entity may operate a plurality of servers to service client requests for data. Traditionally, when the load on a first server approached a peak load, a second server would be spun up in order to service future requests for data once the load on the first server reaches the peak load. Instead of provisioning server space in advance of a need for the server, the methods described herein may be used to spin up a server when it is actually needed.

In an embodiment, an entity operates a plurality of servers. When a proxy server receives a request for data, the proxy server determines whether a currently online server has reached capacity. For example, each server may be programmed or configured to monitor a current load on the server, such as network utilization, CPU usage, outgoing bitrate, physical memory usage, other metrics for measuring load on a system, and/or any combination of the aforementioned metrics. When the server receives a request for data, the server may determine if the current load is greater than a predetermined peak threshold and/or whether servicing the request for data would bring the load of the server above the predetermined peak threshold. In response to determining that the load equals or exceeds the predetermined peak threshold, the server computer may respond to the proxy server that it is unable to handle the current request for data. Additionally and/or alternatively, one or more outside services may monitor the load on the servers and send current load data to the proxy server which uses the load data and a predetermined threshold to determine if the server is capable of handling additional requests for data.

In response to determining that the currently online server has reached capacity, the proxy server may identify an offline server to receive the request to access data. Using the techniques described herein, the proxy server may spin up the offline server to handle the new request. Because the proxy server spins up the new server in the background, from the perspective of the client computing device, there is little to no difference between accessing the currently online server and accessing the currently offline server. Additionally, as the proxy server spins up the server in order to service the request to access data, the new server is brought online when it is needed instead of in apprehension of the need for a server in the future.

Additionally, the techniques described herein may increase the efficiency with which a single server is used. For example, a particular server may receive requests to access data rarely. If the particular server is kept online at particular times of the day, then there may exist times where an entity operating the server is paying for server use when the server is not fulfilling any requests for data. The techniques described herein may be used to spin up a server in response to a request to access data, thus allowing the server to be kept offline until it is needed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
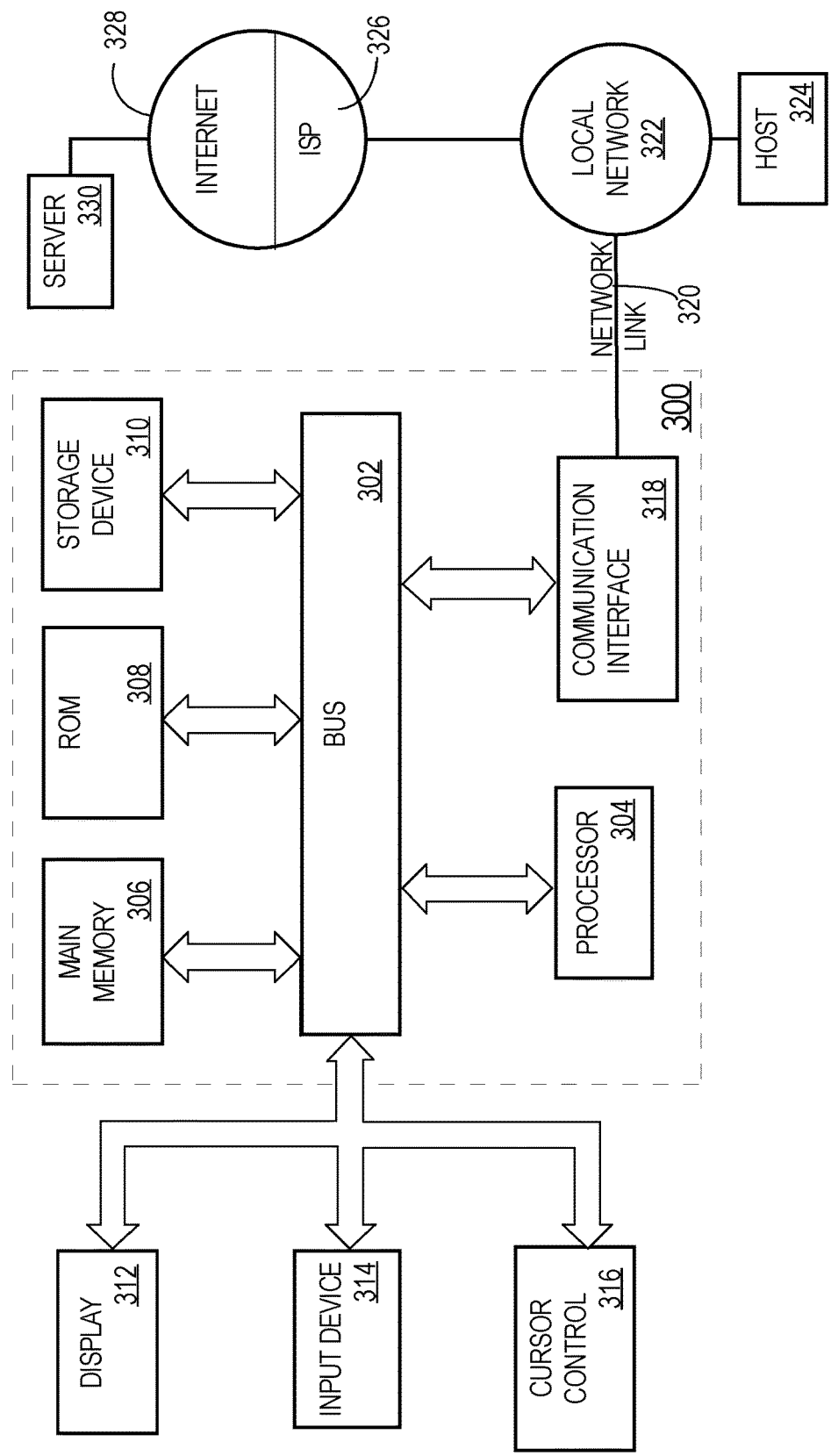
FIG. 3 is a block diagram that illustrates a computer system upon which an embodiment may be implemented

For example, FIG. 3 is a block diagram that illustrates a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A method comprising:
receiving, at a proxy server computer from a client computing device, a request to access data over a network;
identifying, at the proxy server computer, a particular server computer that is separate from the proxy server computer to fulfill the request from the client computing device;

determining, at the proxy server computer, that the particular server computer is unavailable to the client computing device;
in response to determining that the particular server computer is unavailable to the client computing device, performing, at the proxy server computer:
maintaining a transport layer connection from the client computing device;
while maintaining the transport layer connection, initiating startup of the particular server computer;
while the particular server computer is unavailable to the client computing device, receiving particular data from the client computing device to be sent to the particular server computer and storing the particular data at the proxy server computer;
determining that the particular server computer is available to the client computing device;
in response to determining that the particular server computer is available to the client computing device, acting as a proxy to connect the client computing device to the particular server computer and forwarding the particular data to the particular server computer.

2. The method of claim 1:
wherein the particular server computer is a mobile computing device;
wherein initiating startup of the particular server computer comprises sending a message to the mobile computing device over WiFi or a cellular network to bring the mobile computing device into an active state from an inactive state.

3. The method of claim 1:
wherein the request to access data over the network is encrypted using a transport security layer (TLS) protocol;
wherein identifying the particular server computer comprises extracting a destination identifier from a TLS handshake sequence in the request to access data.

4. The method of claim 3, wherein the destination identifier comprises a hostname in a TLS ClientHello message.

5. The method of claim 1, further comprising:
identifying, from the request to access data, one or more services to be used by the client computing device;
in response to identifying the one or more services, starting up the one or more services after determining that the particular server computer is available to the client computing device.

6. The method of claim 1, further comprising:
causing displaying, on the client computing device, an option to access the particular server computer;
wherein the request to access data is a selection of the option to access the particular server computer;
performing proxying the connection from the client computing device to the particular server computer without causing displaying, at the client computing device, an indication that the particular server computer is unavailable to the client computing device.

7. The method of claim 1, further comprising:
extracting, from the request to access data, identification data of the client computing device;
identifying the particular server computer based, at least in part, on the identification data of the client computing device.

8. The method of claim 7, wherein the identification data comprises one or more of an operating system of the client computing device, a geographical location of the client computing device, an internet protocol (IP) address of the client computing device, and or a header of the request.

9. The method of claim 1, further comprising:
identifying a first server computer to receive the request to access data;
determining that a load on the first server computer is greater than a particular load threshold;
in response to determining that the load on the first server computer is greater than the particular load threshold, identifying the particular server computer.

10. A computing system comprising:
one or more processors;
one or more non-transitory computer-readable storage media storing instructions which, when executed using the one or more processors, cause the one or more processors to perform:
receiving, at a proxy server computer from a client computing device, a request to access data over a network;
identifying, at the proxy server computer, a particular server computer that is separate from the proxy server computer to fulfill the request from the client computing device;
determining, at the proxy server computer, that the particular server computer is unavailable to the client computing device;
in response to determining that the particular server computer is unavailable to the client computing device, performing, at the proxy server computer:
maintaining a transport layer connection from the client computing device;
while maintaining the transport layer connection, initiating startup of the particular server computer;
while the particular server computer is unavailable to the client computing device, receiving particular data from the client computing device to be sent to the particular server computer and storing the particular data at the proxy server computer;
determining that the particular server computer is available to the client computing device;
in response to determining that the particular server computer is available to the client computing device, acting as a proxy to connect the client computing device to the particular server computer and forwarding the particular data to the particular server computer.

11. The system of claim 10:
wherein the request to access data over the network is encrypted using a transport security layer (TLS) protocol;
wherein identifying the particular server computer comprises extracting a destination identifier from a TLS handshake sequence in the request to access data.

12. The system of claim 11, wherein the destination identifier comprises a hostname in a TLS ClientHello message.

13. The system of claim 12, wherein the instructions, when executed using the one or more processors, further cause the one or more processors to perform:
identifying, from the request to access data, one or more services to be used by the client computing device;
in response to identifying the one or more services, starting up the one or more services after determining that the particular server computer is available to the client computing device.

14. The system of claim 10, wherein the instructions, when executed using the one or more processors, further cause the one or more processors to perform:
- causing displaying, on the client computing device, an option to access the particular server computer;
- wherein the request to access data is a selection of the option to access the particular server computer;
- performing proxying the connection from the client computing device to the particular server computer without causing displaying, at the client computing device, an indication that the particular server computer is unavailable to the client computing device.

15. The system of claim 10, wherein the instructions, when executed using the one or more processors, further cause the one or more processors to perform:
- extracting, from the request to access data, identification data of the client computing device;
- identifying the particular server computer based, at least in part, on the identification data of the client computing device.

16. The system of claim 15, wherein the identification data comprises one or more of an operating system of the client computing device, a geographical location of the client computing device, an internet protocol (IP) address of the client computing device, and or a header of the request.

17. The system of claim 10, wherein the instructions, when executed using the one or more processors, further cause the one or more processors to perform:
- identifying a first server computer to receive the request to access data;
- determining that a load on the first server computer is greater than a particular load threshold;
- in response to determining that the load on the first server computer is greater than the particular load threshold, identifying the particular server computer.

18. One or more non-transitory computer-readable media storing instructions which, when executed by one or more processors, cause the one or more processors to perform:
- receiving, at a proxy server computer from a client computing device, a request to access data over a network;
- identifying, at the proxy server computer, a particular server computer that is separate from the proxy server computer to fulfill the request from the client computing device;
- determining, at the proxy server computer, that the particular server computer is unavailable to the client computing device;
- in response to determining that the particular server computer is unavailable to the client computing device, performing, at the proxy server computer:
  - maintaining a transport layer connection from the client computing device;
  - while maintaining the transport layer connection, initiating startup of the particular server computer;
  - while the particular server computer is unavailable to the client computing device, receiving particular data from the client computing device to be sent to the particular server computer and storing the particular data at the proxy server computer;
  - determining that the particular server computer is available to the client computing device;
  - in response to determining that the particular server computer is available to the client computing device, acting as a proxy to connect the client computing device to the particular server computer and forwarding the particular data to the particular server computer.

19. The one or more non-transitory computer-readable media of claim 18:
- wherein the request to access data over the network is encrypted using a transport security layer (TLS) protocol;
- wherein identifying the particular server computer comprises extracting a destination identifier from a TLS handshake sequence in the request to access data.

20. The one or more non-transitory computer-readable media of claim 19, wherein the destination identifier comprises a hostname in a TLS ClientHello message.

21. The one or more non-transitory computer-readable media of claim 18, wherein the instructions, when executed using the one or more processors, further cause the one or more processors to perform:
- identifying, from the request to access data, one or more services to be used by the client computing device;
- in response to identifying the one or more services, starting up the one or more services after determining that the particular server computer is available to the client computing device.

22. The one or more non-transitory computer-readable media of claim 18, wherein the instructions, when executed using the one or more processors, further cause the one or more processors to perform:
- causing displaying, on the client computing device, an option to access the particular server computer;
- wherein the request to access data is a selection of the option to access the particular server computer;
- performing passing the connection from the client computing device to the particular server computer without causing displaying, at the client computing device, an indication that the particular server computer is unavailable to the client computing device.

23. The one or more non-transitory computer-readable media of claim 18, wherein the instructions, when executed using the one or more processors, further cause the one or more processors to perform:
- extracting, from the request to access data, identification data of the client computing device;
- identifying the particular server computer based, at least in part, on the identification data of the client computing device.

24. The one or more non-transitory computer-readable media of claim 23, wherein the identification data comprises one or more of an operating system of the client computing device, a geographical location of the client computing device, an internet protocol (IP) address of the client computing device, and or a header of the request.

25. The one or more non-transitory computer-readable media of claim 18, wherein the instructions, when executed using the one or more processors, further cause the one or more processors to perform:
- identifying a first server computer to receive the request to access data;
- determining that a load on the first server computer is greater than a particular load threshold;
- in response to determining that the load on the first server computer is greater than the particular load threshold, identifying the particular server computer.

* * * * *